Sept. 13, 1960　　　　P. THIBAULT　　　　2,952,162
CHAIN STRUCTURES, ESPECIALLY FOR USE IN CONVEYOR SYSTEMS
Filed Aug. 5, 1958　　　　　　　　　　　　　　3 Sheets-Sheet 1

INVENTOR
PAUL THIBAULT
BY Bailey, Stephens and Huettig
ATTORNEYS

Sept. 13, 1960        P. THIBAULT        2,952,162

CHAIN STRUCTURES, ESPECIALLY FOR USE IN CONVEYOR SYSTEMS

Filed Aug. 5, 1958        3 Sheets-Sheet 2

INVENTOR
PAUL THIBAULT,

BY Bailey, Stephens and Huettig
ATTORNEYS

Sept. 13, 1960  P. THIBAULT  2,952,162
CHAIN STRUCTURES, ESPECIALLY FOR USE IN CONVEYOR SYSTEMS
Filed Aug. 5, 1958  3 Sheets-Sheet 3

INVENTOR
PAUL THIBAULT,

BY Bailey, Stephens and Huettig
ATTORNEYS

United States Patent Office 2,952,162
Patented Sept. 13, 1960

2,952,162

CHAIN STRUCTURES, ESPECIALLY FOR USE IN CONVEYOR SYSTEMS

Paul Thibault, 25 Rue Ernest Renan, Eaubonne, France

Filed Aug. 5, 1958, Ser. No. 753,302

Claims priority, application France Aug. 6, 1957

7 Claims. (Cl. 74—254)

This invention relates to chain structures of the type that are adapted to be readily assembled and taken apart, preferably without the help of tools, whereby such chains can be easily lengthened or shortened depending on particular requirements, and whereby also individually damaged links of the chain can be easily replaced.

While various types of such chain structures are known and used, such conventional structures generally have drawbacks some of which will be pointed out hereinafter, and it is therefore a general object of this invention to provide an improved and generally more satisfactory, dismantable chain structure than any heretofore available.

For convenience in the ensuing disclosure, the following definitions are given of some of the terms used therein. As any chain, the chains of the type here contemplated are made up of separate components which may conveniently be termed links. Adjacent links are connected through means herein termed pivots.

When the chain is trained over suitable end supports so as to extend generally in a plane, the common geometrical plane forming a plane of symmetry for all of the links is termed the midplane of the chain. It should be understood however that this term will be used for convenience in description only, since a chain can obviously be made to extend over a non-planar surface, and in fact it will be shown that the chain structure of this invention is particularly suitable for operation in an angled or deflected condition.

Each chain link may consist of one or more "link elements." In any pair of adjacent links of the chain, generally one link, herein called the "inner" link, has its element(s) positioned closer to the midplane of the chain than the element(s) of the other link, called the "outer" link. Usually an inner link comprises but a single link element the midplane of symmetry of which is coincident with the chain midplane; and an outer link comprises a pair of similar link elements symmetrically arranged to either side of the chain midplane. Usually also the two spaced elements of an outer link are parallel. In most cases each link element is generally in the shape of an elongated ring with two parallel sides interconnected at their ends by semi-circular portions. It should be understood that none of the arrangements just described are essential in the construction of a chain according to the invention and that different link arrangements might readily be used.

In prior chains of the dismantable type, the link elements usually had to be of relatively complicated shape and were difficult and expensive to manufacture. Moreover, the links were not so constructed that they could readily lend themselves to deflections of the chain out of its midplane without giving rise to various unbalanced forces, friction, and other mechanically objectionable effects. Further, in prior chains of this type, whenever a chain link or pivot was for any reason displaced from its normal relative positions, there was no particular tendency for the chain tension to urge it back to such position, so that the link or pivot had to be forced back thereto for satisfactory operation of the chain.

Objects of this invention, accordingly, include the provision of a chain structure of the type adapted to be readily assembled and taken apart, wherein the various chain link elements can be made of any convenient shape, including extremely simple shapes that are easy to produce; in this connection a main feature of the invention making this object possible relates to the particular design of the pivot means interconnecting the links.

Another object is to provide such a chain which can be readily angled or deflected out of its plane without impairing the mechanical behaviour of the chain; and to provide such a chain wherein the links and pivots, should they be disturbed from their normal relative position, will automatically tend to be restored thereto by the tension acting on the chain.

In accordance with the invention, the pivot connecting an inner link with an outer link, is formed near its opposite ends with respective bearing surfaces each formed with a groove for receiving an end of a related element of an outer link, which grooves are limited outwardly by head portions so shaped and dimensioned that, with both the pivot and the outer link elements occupying substantially their normal positions, said heads will prevent withdrawal of the outer link elements from the pivot, but will allow such withdrawal on relative displacement between said heads and outer links, and said pivot further comprising a central bearing surface providing a journal for an end of an inner link element; preferably, the geometric axis of the central bearing surface is longitudinally displaced from the common geometric axis of the end bearing surfaces, towards the inner link.

Preferably also, each end of each link element is of generally rounded shape, e.g. a semi-circular ring, and the central bearing surface of the pivot is of concave, semi-toroidal or saddle-shaped configuration.

In a desirable form of the invention the pivots are so shaped that an inner link element can be withdrawn therefrom and inserted thereon simply by imparting to the element a rotation of about a quarter turn in a suitable direction about one of the heads of the two pivots with which said inner link is connected.

One of the improvements provided by the invention is for the purpose of preventing rotation of the pivots with respect to one of the two links, i.e. the outer link or the inner link, which the pivot serves to connect, in the assembled condition of the chain, while permitting easy assembly of the link elements. According to this improvement, one at least of the end grooves in the pivot is formed with a flatted portion such that, with the end of a link element positioned in said groove, the pivot will be prevented by the flat portion from rotating with respect to the link element. This feature ensures high additional safety for positively preventing inadvertent dismantling of the chain as a result of accidental rotation imparted to a pivot in service.

An exemplary form of embodiment of the invention will now be described for purposes of illustration with reference to the accompanying drawings, wherein.

Figure 1:
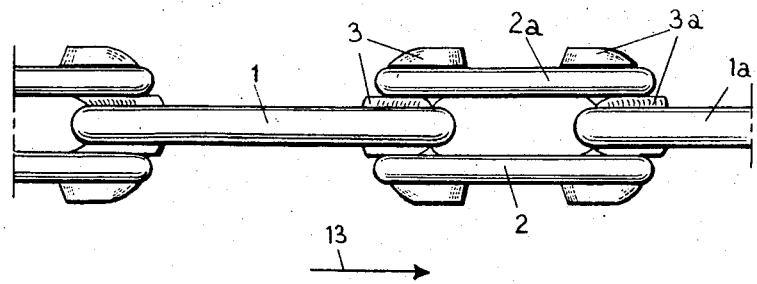
Fig. 1 shows part of the chain in side elevation, i.e. with the midplane of the chain being parallel to the plane of the drawing.
Figure 2:
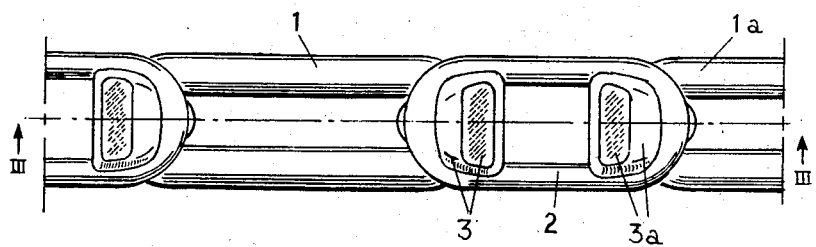
Fig. 2 is a corresponding plan view.

In the drawings, reference 1 designates an inner link, which in the illustrated exemplary embodiment consists of but a single link element; and 2 and 2a designate the parallel spaced elements of an outer link. In the embodiment shown all the link elements are simple elongated rings including two parallel straight sides interconnected by semi-circular end portions. The cross sectional shape of the link element is preferably that of a cylindrical rod and is uniform throughout the element. While other configurations than that shown might be used for the link elements, the highly simplified shape just described is especially advantageous; and, in fact, the high simplicity of the link configurations made possible by the invention forms one of the outstanding features thereof.

Figure 3:
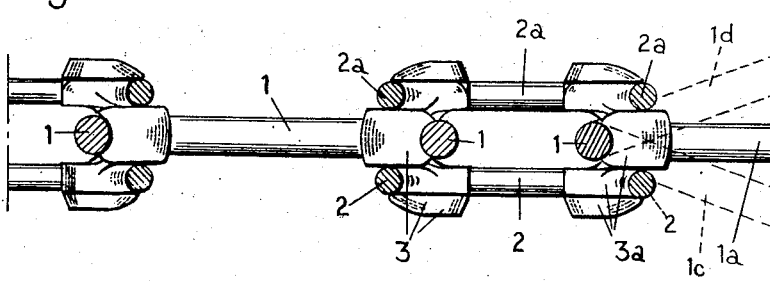
Fig. 3 is similar to Fig. 1 but with the chain elements seen in section on line III—III of Fig. 2.

Two separate pivots are shown at 3 and 3a. Referring to Fig. 3, the dotted-line contours 1c and 1d indicate the angularly-displaced end positions which an inner link element is able to assume when the chain is locally warped or angled, i.e. deflected out of its midplane. In these end positions, the inner link element is abutted against a surface of one or the other of the elements 2, 2a of the outer link. Such an angling of the chain according to the invention can be accomplished under highly satisfactory mechanical conditions, with the inner link element being supported against the central bearing surface (see 8a, Fig. 4) of the pivot.

Figure 7:
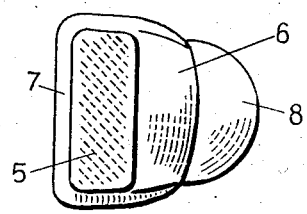
Figs. 4 to 9 illustrate different views of the pivot.
Figure 8:
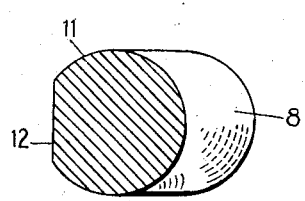
Figure 5:
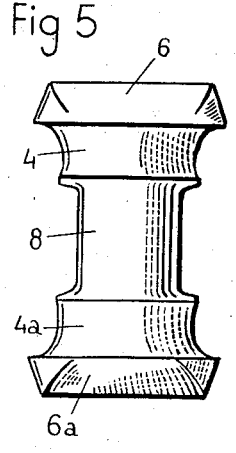
Figure 4:
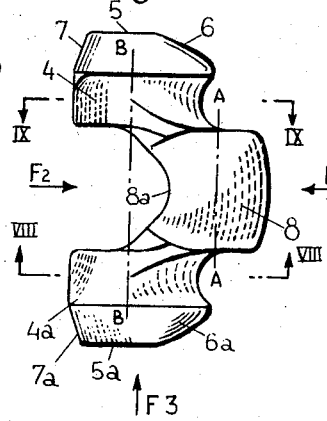
Figure 6:
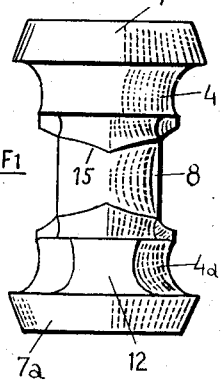

Fig. 4 is a view of the pivot in longitudinal elevation; Fig. 5 is a view along the arrow F1 in Fig. 4; Fig. 6 is a view along arrow F2 in Fig. 4; Fig. 7 is a view along arrow F3 in Fig. 4; Fig. 8 is a view in section on line VIII—VIII in Fig. 4, and Fig. 9 is a view in section on line IX—IX of Fig. 4.

In these views, 4 and 4a designate the two end grooves of the pivot, outwardly limited by heads each including a flat end portion 5—5a and two side bevel surfaces 6—6a and 7—7a. In between the grooves 4 and 4a is the central bearing 8 of the pivot, which includes a portion 8a in the form of a concave semi-toroidal, or saddle-shaped surface, which is of revolution about a geometric axis A—A this axis being displaced longitudinally from the common geometric axis B—B of the end bearings 4 and 4a. With the chain normally assembled as in Fig. 1, the inner link 1 may be freely rotated with respect to the central bearing 8—8a, about the axis A—A as a geometric center of rotation.

Figure 9:
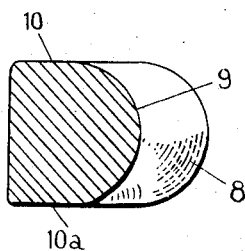

In the exemplary embodiment shown, one of the end grooves 4 is formed with a circular end portion 9 and two flat sides 10, 10a, as is apparent from Fig. 9. The two side flats prevent the pivot from rotating with respect to the outer link element 2a (Fig. 1) in the assembled condition of the chain, thereby positively preventing unwanted dismantling of the chain in normal service. For as will later appear, one of the steps required in order to dismantle a link of the chain is that both pivots connected with the particular link to be removed must each be turned a quarter-revolution, in reverse directions to each other, from their normal positions in the link. As will also appear hereinafter, before the pivots can thus be turned for a dismantling operation, the two pivots first have to be moved in towards each other as shown in Fig. 11. This in turn allows both associated elements 2—2a of each of the outer links associated with the pivot to be moved closer to each other (in the vertical direction as seen in Fig. 10, and to the end positions of the said elements shown in this figure); this movement serves to remove the link element 2a from engagement with the flatted surfaces 10—10a (Fig. 9); only then does it become possible to swing each of the pivots 3 and 3a about a vertical geometric axis (as in Figs. 1, 3 and 10) to bring the pivots to the relative position shown in Fig. 11.

In the exemplary embodiment, the flats 10 and 10a are provided in association with the groove 4. The other groove 4a however is fully circular as shown at 11 in Fig. 8, except for a small front flat 12 directed in the same direction as the concavity of the central bearing surface 8a, for convenience in the machining operations.

Figure 10:
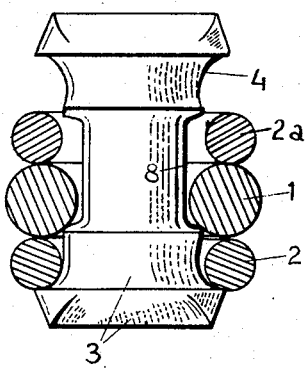
Fig. 10 is similar to Fig. 6 but further shows in section the link elements associated with the pivot in an initial stage of a dismantling operation.
Figure 11:
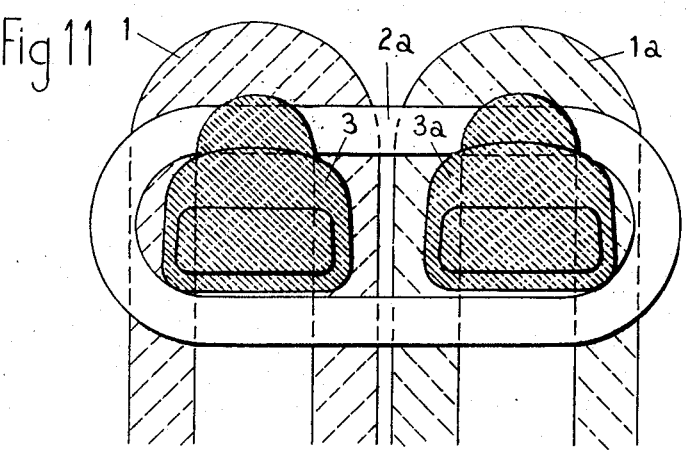
Fig. 11 is a plan view showing a subsequent stage.
Figure 12:
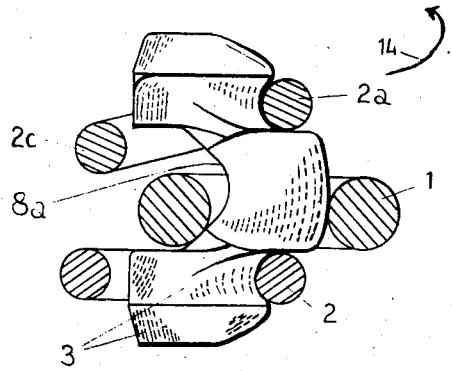
Fig. 12 is similar to Fig. 5 but further showing in section associated link elements in the latter stages of dismantling.

Figs. 10 to 12 show three stages of the operations involved in dismantling a chain link, which will now be described in detail.

In the condition shown in Fig. 10 the pivot 3 has been displaced in the direction indicated by arrow 13 in Fig. 1, i.e. inwardly of the outer link 2—2a, and the inner link element 1 has been displaced bodily with the pivot in the same direction towards the outer link. As a result the inner link element 1 and the upper outer link element 2a have now dropped slightly away from their normal positions upon the pivot 3 to the positions shown in Fig. 10 in which the inner link element 1 is substantially resting upon the top of the lower outer element 2, and the upper outer element 2a is resting on the top of the inner element 1. As already mentioned, the element 2a has moved out of engagement with the side flats 10 and 10a (Fig. 9). Hence the pivot 3 is now (and only now) able to swing about a geometric axis normal to the midplane of the chain.

On the pivot 3 now being swung 90° in this way, the pivot is brought to the position shown in Fig. 11 relative to link element 2a.

The other pivot 3a associated with the same outer link 2—2a on its side had similar displacements imparted to it relative to this outer link, but in the reverse sense i.e. towards pivot 3, so that both pivots 3 and 3a are now positioned as shown in Fig. 11. Fig. 11 also shows that each of the two inner link elements 1 and 1a connected to the outer link 2—2a under consideration have been swung over a 90° arc with respect to this outer link so that they now extend parallel and side by side as shown.

In this condition of the parts the outer link element 2a can very easily be removed from both pivots 3 and 3a. Referring to Fig. 12, it is only necessary to impart to the link element 2a an arcuate displacement or twist as generally indicated by the curved arrow 14: that is, link element 2a is first shifted rightwards so that its left side 2c is inserted in the recess defined at the top of concave portion 8a, whereupon the element is rotated counterclockwise about the side part 2c as a center so as to lift the opposite side of the link element off the head of the pivot. According to the invention, the outer link elements and the pivots are so shaped and dimensioned as to permit this twisting movement. After removal of the upper link element 2a, the inner link elements 1 may, if desired, be in turn lifted off the pivot.

As to the lower outer link element 2, this may be removed in a similar manner to the upper element 2, off the opposite end of the pivot, or it may be removed from the same side as the upper element, after removal of the inner link element.

In assembling, or re-assembling, the chain links, the reverse procedure is followed from that described. Thus, in order to re-assemble an outer link 2—2a positioned between two consecutive inner links 1 and 1a (Fig. 1), the two pivots 3 and 3a are first positioned substantially side by side in the manner shown in Fig. 11, i.e. rotated 90° from their final positions so that the concave surfaces 8a of the central bearings of both pivots are facing in a common direction towards a side of the chain. In this position the heads of both pivots can easily be inserted into a first outer link element 2 until this element is positioned around the lower end groove as shown in Figs. 10 and 12. Each of the inner link elements 1 and 1a is then passed over the upper head of a respective one of the pivots so as to lie substantially on a level with the central bearing surface 8—8a of each pivot near the base of said central bearing. The upper outer link element 2a can now be inserted over the heads of both pivots simultaneously by an arcuate twisting movement reverse from that indicated by arrow 14 in Fig. 12. The pivots are then each turned 90° in opposite directions so that their concave central surfaces 8a are directed longitudinally of the chain away from each other, and are pulled apart while at the same time pulling the two inner links 1 and 1a into alignment with each other, whereupon each end of each of the four link elements involved is pulled positively into its correctly seated position in a related bearing surface of a pivot.

The links are now assembled as shown in Fig. 1, and the inner links can be freely rotated about the pivots in the midplane of the chain, about the axes A—A (Fig. 4) of the central bearing surfaces as the geometric centers of rotation.

Moreover, it will be noted that owing to the particular shape imparted according to the invention to the concave central bearing surface 8a, each inner link can be deflected away from the midplane of the chain (i.e. vertically upwards or downwards as seen in Fig. 1). This imparts improved flexibility to the chain structure, a feature not generally available in conventional chains of the dismantlable type, while retaining a highly simple link configuration. The angular range of deflection is limited by abutment of the inner link element with a shoulder surface . . . in either direction.

While improved chain structures according to this invention may be applied for various purposes, a particularly advantageous use is in connection with endless conveyor chains, since in this field the feature that the chain can be deflected out of its midplane by relatively large angular amounts is especially valuable in order to conform to various circuitous paths of conveyor travel. Another advantage of such a chain is that the "pitch" of the chain, i.e. the spacing between adjacent pivots, can readily be made equal if so desired. Further advantages of the novel chain structure when used as a conveyor chain or for other purposes, include the fact that its construction is greatly facilitated by the extremely low number of different components it comprises. Thus, there is only a single type of pivot member, and only two types of link element. It will be noted that the inner and outer link elements herein are shown to be of somewhat different dimensions, with the inner element being more largely dimensioned than each of the two outer link elements to provide substantially uniform strength throughout the chain. However both types of link elements might be made identical if desired.

Another advantage is the fact that the pivots in a chain according to the invention are inherently so conformed that the chain tension obtaining in normal operating conditions will automatically tend to prevent the links and pivots from being displaced from their proper seated positions, and to restore them to such positions if accidently disturbed. This feature of the improved chain primarily results from the relative longitudinal displacement present between the geometrical axes of the central and end bearing surfaces of each pivot (see Fig. 4), whereby in case of inadvertent relative rotation of the pivot, the traction force transmitted through the chain will at once generate a strong moment of rotation to restore the pivot to its proper relative angular position.

It will be understood that various modifications may be made in the specific details of construction illustrated and described without departing from the scope of the invention as defined by the ensuing claims.

What I claim is:

1. A chain comprising two different interior and exterior alternating closed links having elongated openings therein and a pivot connecting each pair of links, the exterior links each comprising first and second exterior link parts located on opposite sides of each interior link, each pivot comprising a body having two spaced outer bearing portions provided on a first side of the body with grooves for receiving the ends of the exterior link parts and a central bearing portion provided on the opposite side of the body with a groove for receiving the end of the interior link, said grooves being partly circular about parallel axes transverse to the length of the chain, the axes of the exterior link grooves coinciding and being displaced with respect to the axis of the interior link groove in the direction of such other side of the body, enlarged heads at each end of the body outside the exterior link bearing portions, said heads having a dimension in a direction perpendicular to the common plane of said axes substantially greater than the width of the openings of the exterior link parts, the space between the exterior link bearing portions being at least equal to the combined thickness of the interior link and one of the exterior link parts, at least the exterior link bearing portion for the first exterior link part having surfaces extending from said groove in directions generally parallel to the common plane of said axes which coincide with the parts of the interior surfaces of said first exterior link part adjacent the end which engages such groove so as normally to prevent turning of the first exterior link part around the axis of the groove, at least said exterior link bearing portion for said first link part having a dimension in a direction perpendicular to said common plane not greater than the space between the interior surfaces of the first exterior link part, whereby, upon relaxation of the chain, at each end of an exterior link, said first exterior link part can be shifted inwardly off its bearing portions, and the two adjacent interior links at opposite ends of the exterior link can be turned parallel to each other, the bodies being then turned with respect to the exterior link so that the common plane of said axes of each body is perpendicular to the longitudinal axis of the exterior link, whereupon said first exterior link part can enter the space between the outer bearing portions and can then swing over the heads to disengage said first exterior link part, thereby permitting removal of the interior link and the second exterior link part.

2. A chain as claimed in claim 1 in which the links have parallel sides and rounded ends.

3. A chain as claimed in claim 1 in which the thickness of the interior link is substantially less than the space between the exterior link parts to permit bending of the chain in a direction parallel to the common plane of said axes.

4. A chain as claimed in claim 1 in which said central bearing portion is toroidal in shape.

5. A chain as claimed in claim 1 in which the end portions of the links are of circular cross-section.

6. A chain as claimed in claim 1, in which the head has a minimum dimension in the plane of said axes less than the space between the side portions of the interior link, whereby said interior link can be swung over the heads and removed.

7. A chain as claimed in claim 1, in which the pivot body has extensions of the central groove around the central part of the body, said extensions being of increased width and being defined by shoulder portions, so as to allow a limited twisting of the chain around its longitudinal axis.

References Cited in the file of this patent

UNITED STATES PATENTS

| | | |
|---|---|---|
| 304,325 | Howe | Sept. 2, 1884 |
| 359,029 | Perkins | Mar. 8, 1887 |
| 1,557,172 | Klein et al. | Oct. 13, 1925 |
| 1,687,005 | Brock | Oct. 9, 1928 |
| 1,705,352 | Ball | Mar. 12, 1929 |
| 2,600,174 | Sheehan | June 10, 1952 |